US005443905A

United States Patent [19]

Sawada et al.

[11] Patent Number: 5,443,905

[45] Date of Patent: Aug. 22, 1995

[54] HEAT AND OXIDATION RESISTANT COMPOSITE ELECTRICAL CONDUCTOR

[75] Inventors: Kazuo Sawada; Shinji Inazawa; Kouichi Yamada, all of Osaka, Japan

[73] Assignee: Sumitomo Electric Industries, Ltd., Osaka, Japan

[21] Appl. No.: 185,276

[22] Filed: Jan. 24, 1994

Related U.S. Application Data

[63] Continuation of Ser. No. 823,995, Jan. 22, 1992, abandoned.

[30] Foreign Application Priority Data

Jan. 24, 1991 [JP] Japan .................................. 3-007269

[51] Int. Cl.[6] .............................................. B32B 15/02

[52] U.S. Cl. .................................... 428/368; 428/378; 428/379; 428/384; 428/389; 428/469; 428/472; 428/627; 428/698; 428/699; 428/702; 428/704; 174/98; 174/126.1; 174/126.2; 174/110 A

[58] Field of Search ............... 428/469, 472, 688, 699, 428/702, 698, 336, 325, 704, 697, 621, 627, 368, 378, 379, 384, 389; 174/98, 126.1, 126.2, 110 A, 126.4, 120 R, 120 C

[56] References Cited

U.S. PATENT DOCUMENTS

| | | | |
|---|---|---|---|
| 2,207,579 | 1/1939 | Carl | 174/110 A |
| 2,975,078 | 3/1961 | Rayfield | 174/110 A |
| 3,109,053 | 10/1963 | Ahearn | 174/126.1 |
| 3,636,242 | 1/1972 | Hansson | 174/126.2 |
| 4,620,086 | 10/1986 | Ades | 174/110 A |
| 4,707,416 | 11/1987 | Ebata | 428/627 |
| 5,035,957 | 7/1991 | Bartlett | 428/627 |

FOREIGN PATENT DOCUMENTS

| | | |
|---|---|---|
| 0029888 | 6/1981 | European Pat. Off. . |
| 0170440 | 2/1986 | European Pat. Off. . |
| 0179527 | 4/1986 | European Pat. Off. . |

*Primary Examiner*—Ellis P. Robinson
*Assistant Examiner*—Timothy M. Speer
*Attorney, Agent, or Firm*—W. G. Fasse; W. F. Fasse

[57] ABSTRACT

A heat and oxidation resistant electrically conductive composite conductor has a core (1) made of copper or a copper alloy, an electrically conductive ceramics layer (2) around the core (1), and a nickel layer (3) on the exterior of the electrically conductive ceramics layer (2). Such a conductor is produced by coating the outer surface of the core copper alloy binder and covering the coated core with a nickel tape under an atmosphere of an inert gas or a reducing gas, welding the seam of the tape, clading the so formed conductor by a cladding die, and drawing the clad conductor. The composite conductor has a high conductivity which is not reduced even when the conductor is exposed to a high temperature operating condition.

16 Claims, 2 Drawing Sheets

HEAT AND OXIDATION RESISTANT COMPOSITE ELECTRICAL CONDUCTOR

This application is a CONTINUATION; of application Ser. No. 07/823,995, filed on Jan. 22, 1992, now abandoned.

FIELD OF THE INVENTION

The present invention relates to an electric conductor, which can be used under a high temperature and/or in an oxidizing atmosphere.

BACKGROUND INFORMATION

An electric conductor is generally made of aluminum, an aluminum alloy, copper or a copper alloy. However, aluminum has a low melting point of 660° C. and exhibits no strength under a high temperature. An aluminum alloy also has similar problems. On the other hand, copper has a melting point of 1063° C. and is superior to aluminum in strength under a high temperature. However, copper is easily oxidized under a high temperature. A copper alloy also has a similar problem. Thus, a heat-resistant conductor is formed by a nickel-plated copper wire which is made of copper having a nickel-plated surface.

However, although such a nickel-plated copper wire causes no problem when the same! is used at about 400° C., its conductive property is reduced under a higher temperature due to diffusion and alloying of copper and nickel. When the wire is used at 600° C. for 2000 hours, for example, its conductivity is reduced by about 20%. While platinum and gold have no such problem, it is inadvisable to put these materials into practice since the same are extremely high-priced.

SUMMARY OF THE INVENTION

It is an object of the present invention to solve the above problem of the prior art and provide a low cost highly conductive conductor, whose conductivity is not reduced under a high temperature.

A composite conductor according to the present invention comprises a core which is made of copper or a copper alloy, a conductive ceramics layer which is provided around the core, and a nickel layer which is provided on the exterior of the conductive ceramics layer.

In order to prevent the nickel layer from oxidation under a high temperature, an oxidation inhibiting ceramics layer may be further provided on the exterior of the nickel layer.

The present composite conductor can be manufactured by the following method, for example: Namely coating a core material by extruding a mixture of conductive ceramics powder and a binder around the core material for forming a conductive ceramics layer on the core, then covering the conductive ceramics coated core with a nickel tape under an atmosphere of an inert gas or a reducing gas, continuously welding the seam of the nickel tape and cladding the wire by a cladding die, and then drawing the clad wire to a prescribed wire diameter.

When a ceramics layer is further provided around the nickel layer in order to prevent the same from oxidation or the like, this layer can be formed around the drawn wire.

In the composite conductor according to the present invention, the core is made of copper or a copper alloy. Copper or a copper alloy, having the highest conductivity next to silver, is relatively low-priced as compared with silver, and industrially available. Thus, the present composite conductor comprising a core of copper or a copper alloy can be manufactured at a low cost for industrial purpose.

It is possible to improve the strength of the conductor under a high temperature without substantially reducing the conductivity, by employing a copper alloy containing 0.1% of silver.

According to the present invention, the electrically conducting ceramics layer may be made of a carbide, a nitride, a boride or a silicide of a transition metal such as tungsten carbide, zirconium nitride, titanium boride or molybdenum silicide, or carbon, molybdenum disulfide or the like.

According to the present invention, the electrically conducting ceramics layer which is provided between the core part and the nickel layer prevents diffusion from the core to the nickel layer and vice versa under a high temperature. According to the present invention, therefore, the conductivity is not reduced even if the conductor is used for a long time in a high-temperature oxidizing atmosphere.

The electrically conducting ceramics layer has preferably a thickness of at least 0.05 μm. Further, particles forming the ceramics layer are preferably not more than 5 μm in mean particle diameter.

In an oxidizing atmosphere of at least 500° C., oxidation of nickel may not be negligible and hence it is preferable to provide an oxidation inhibiting outer ceramics layer in this case, in order to prevent oxidation of the nickel layer. For the purpose of preventing oxidation, the outer ceramics layer is preferably at least 0.3 μm in thickness. In order to provide sufficient insulability, it is preferable to employ insulating ceramics coat in the outer oxidation inhibiting ceramics layer having a thickness of at least 1 μm.

The foregoing and other objects, features, aspects and advantages of the present invention will become more apparent from the following detailed description of the present invention when taken in conjunction with the accompanying drawings.

BRIEF DESCRIPTION OF THE DRAWINGS

Referring to FIG. 1, a conductive ceramics layer 2 is provided around a core 1 of copper or a copper alloy, and a nickel layer 3 is provided around the conductive ceramics layer; Referring to FIG. 2, an oxidation inhibiting ceramics layer 4 is further provided around the nickel layer 3.

DESCRIPTION OF THE PREFERRED EMBODIMENTS

EXAMPLE 1 OF THE INVENTION

Figure 1:
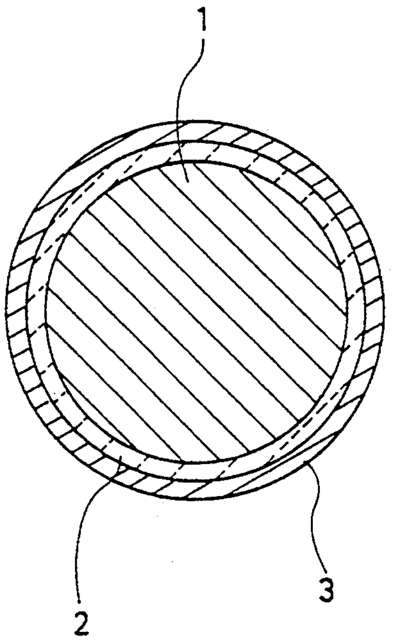
FIG. 1 is a sectional view showing a composite conductor according to an embodiment of the present invention.
Figure 2:
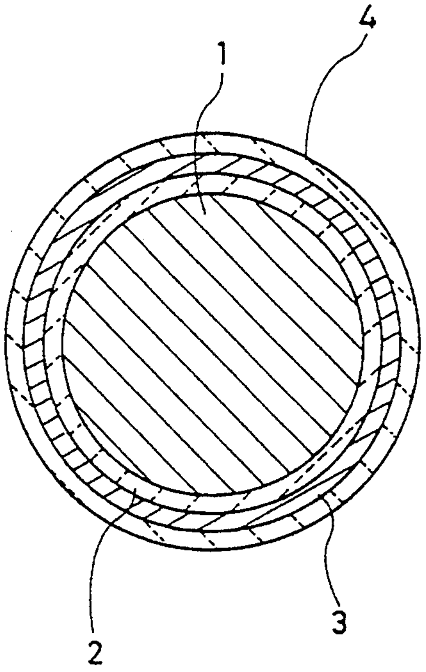
FIG. 2 is a sectional view showing a composite conductor according to another embodiment of the present invention.

A continuously supplied copper wire having a diameter of 2.8 mm was degreased and washed. Then, 10 percent by weight of phenol resin, serving as a binder, was added to and sufficiently mixed with titanium boride powder of 0.3 μm in mean particle diameter. This mixture was continuously extruded and bonded to the periphery of the copper wire which was degreased and washed. Thus, a titanium boride coating layer of 1 μm in thickness was formed. Then, an inert gas or a reducing gas was sprayed onto this wire, which in turn was covered with a nickel tape of 0.3 mm in thickness. After the seam of this tape was welded, the wire was clad and drawn by squeezing into a wire of 1.0 mm in diameter.

The so produced wire exhibited an electrical conductivity, which can be called an initial conductivity, of 83% at room temperature in accordance with the International Annealed Copper Standard (IACS).

This wire exhibited a conductivity, which can be called a heat-resistant operating conductivity, of 82% in according with ACS (International Annealed Copper Standard) after the same was maintained at a temperature of 500° C. for 2000 hours. The nickel layer of this wire was partially oxidized during the exposure to heat.

EXAMPLE 2

The surface of the nickel layer provided on the wire which was prepared in Example 1 was further coated with an $SiO_2$ ceramics layer of 3 μm in thickness. This wire exhibited an electrical conductivity of 83%. Further, the wire exhibited the same conductivity of 83% IACS, after the same was maintained at a temperature of 500° C. for 2000 hours. No oxidation was noted on this wire.

COMPARATIVE EXAMPLE

For the purpose of comparison, a nickel-plated copper wire of 1.0 mm in wire diameter, being coated with a nickel plating layer of 10 μm in thickness, was subjected to a measurement of conductivity, which was 92% IACS. The conductivity was reduced to 65% IACS after the nickel-plated copper wire was maintained at a temperature of 500° C. for 2000 hours. The nickel plating layer provided on the surface of this wire was oxidized during the heat exposure.

As hereinabove described, the composite conductor according to the present invention has an excellent conductive property and can be manufactured at a low cost, since its core is made of copper or a copper alloy. Further, a conductive ceramics layer provided between the nickel layer and the core prevents interdiffusion even under a high temperature. Further, the conductive ceramics layer minimizes any reduction in conductivity. In addition, the conductive ceramics layer contributes to attaining a high conductivity. Thus, the composite conductor according to the present invention is useful as a conductor for a heat-resistant insulated wire.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A composite heat resistant and oxidation resistant electrical wire comprising: an electrically conducting core consisting essentially of copper or a copper alloy and trace amounts of naturally occurring impurities, an electrically conducting intermediate layer circumferentially surrounding said core, said intermediate layer being made of an electrically conducting material including naturally occurring impurities, said electrically conducting material being selected from the group consisting of titanium boride and carbon, and a nickel layer circumferentially surrounding said electrically conducting intermediate layer.

2. The composite electrical wire of claim 1, further comprising an oxidation inhibiting ceramics layer provided on the exterior of said nickel layer.

3. The composite electrical wire qf claim 1, wherein said copper alloy contains at least 0.1 percent by weight of silver.

4. The composite electrical wire of claim 1, wherein said electrically conducting intermediate layer has a thickness of at least 0.05 μm.

5. The composite electrical wire of claim 2, wherein particles forming said electrically conducting intermediate layer and said oxidation inhibiting ceramics layer are at the most 5 μm in mean particle diameter.

6. The composite electrical wire of claim 2, wherein said oxidation inhibiting ceramics layer is at least 0.3 μm in thickness.

7. The composite electrical wire of claim 2, wherein said oxidation inhibiting ceramics layer is at least 1 μm in thickness.

8. The composite electrical wire of claim 1, having an initial conductivity measured in accordance with IACS, said electrical wire having an operating conductivity also measured in accordance with IACS after said composite conductor has been subjected to a temperature of 500° C. for 2000 hours, said operating conductivity being greater than 71% of said initial conductivity.

9. The composite electrical wire of claim 8, wherein said operating conductivity is at least about 98% of said initial conductivity.

10. The composite electrical wire of claim 8, wherein said initial conductivity is about 83% of standard conductivity in accordance with IACS.

11. The composite electrical wire of claim 9, wherein said initial conductivity is about 83% of standard conductivity in accordance with IACS.

12. The composite electrical wire of claim 1, wherein said composite conductor has a conductivity of about 83% of standard conductivity in accordance with IACS.

13. The composite electrical wire of claim 1, wherein said electrically conducting intermediate layer is made of titanium boride, and traces of naturally occurring impurities, and wherein said composite electrical wire has a conductivity of about 83% of standard conductivity in accordance with IACS.

14. The composite electrical wire of claim 2, having an initial conductivity measured in accordance with IACS, said electrical wire having an operating conductivity also measured in accordance with IACS after said composite electrical wire has been subjected to a temperature of 500° C. for 2000 hours, and wherein said operating conductivity is greater than 71% of said initial conductivity.

15. A composite heat resistant and oxidation resistant electrical wire comprising: an electrically conducting core consisting essentially of copper or a copper alloy and trace amounts of naturally occurring impurities, an electrically conducting intermediate layer circumferentially surrounding said core, said intermediate layer including trace amounts of naturally occurring impurities and being made of an electrically conducting material selected from the group consisting of titanium boride and carbon, said electrical wire further comprising a nickel layer circumferentially surrounding said electrically conducting intermediate layer, wherein said intermediate layer inhibits diffusion between said core and said nickel layer, and wherein a heat-resistant operating conductivity of said composite electrical wire measured in accordance with IACS after said composite electrical wire has been subjected to a temperature of 500° C. for 2000 hours is at least about 98% of an initial conductivity of said composite electrical wire measured in accordance with IACS.

16. The composite conductor in accordance with claim 15, wherein said initial conductivity is about 83% of standard conductivity in accordance with IACS.

* * * * *

UNITED STATES PATENT AND TRADEMARK OFFICE

CERTIFICATE OF CORRECTION

PATENT NO. : 5,443,905

DATED : Aug. 22, 1995

INVENTOR(S) : Sawada et al.

It is certified that error appears in the above-identified patent and that said Letters Patent is hereby corrected as shown below: Title page:

In [56] References Cited, line 1, replace "1/1939" by --7/1940--.

In [57] ABSTRACT, line 7, replace "copper alloy" by --with a mixture of conductive ceramics and a--;

line 10, replace "clading" by --cladding--.

Col. 1, line 28, delete "!".

Signed and Sealed this

Seventh Day of November, 1995

Attest:

BRUCE LEHMAN

*Attesting Officer* *Commissioner of Patents and Trademarks*